United States Patent
Lindner

(10) Patent No.: US 7,991,416 B2
(45) Date of Patent: Aug. 2, 2011

(54) PREPACKAGING CALL MESSAGES FOR EACH TARGET INTERATION IN SETTING UP A PUSH-TO-TALK CALL

(75) Inventor: Mark Aaron Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 888 days.

(21) Appl. No.: 11/364,145

(22) Filed: Feb. 27, 2006

(65) Prior Publication Data

US 2007/0202906 A1    Aug. 30, 2007

(51) Int. Cl.
*H04B 7/00* (2006.01)

(52) U.S. Cl. ........................ 455/518; 455/519

(58) Field of Classification Search .......... 455/517–521; 709/227–229
See application file for complete search history.

(56) References Cited

U.S. PATENT DOCUMENTS

| | | | |
|---|---|---|---|
| 6,477,150 B1 | 11/2002 | Maggenti et al. | |
| 2003/0012149 A1 | 1/2003 | Maggenti et al. | |
| 2003/0148779 A1* | 8/2003 | Aravamudan et al. | 455/519 |
| 2003/0190888 A1* | 10/2003 | Mangal et al. | 455/3.05 |
| 2004/0121791 A1* | 6/2004 | May et al. | 455/519 |
| 2004/0240107 A9 | 12/2004 | Khizroev et al. | |
| 2004/0240407 A1 | 12/2004 | Ehrsam et al. | |
| 2006/0019681 A1 | 1/2006 | Harris et al. | |
| 2006/0035658 A1* | 2/2006 | Yoon et al. | 455/518 |
| 2007/0129061 A1* | 6/2007 | Ringland et al. | 455/414.1 |
| 2007/0172045 A1* | 7/2007 | Nguyen et al. | 379/202.01 |
| 2008/0270618 A1* | 10/2008 | Rosenberg | 709/228 |

FOREIGN PATENT DOCUMENTS

| | | |
|---|---|---|
| EP | 1463346 | 9/2004 |
| JP | 2000261539 A | 9/2000 |
| KR | 1020050044625 | 5/2005 |
| KR | 1020050085808 | 8/2005 |
| WO | WO2005057890 A2 | 6/2005 |

OTHER PUBLICATIONS

International Search Report, PCT/US07/062909, International Search Authority, European Patent Office, Jul. 18, 2007.
Written Opinion, PCT/US07/062909, International Search Authority, European Patent Office, Jul. 18, 2007.
Taiwanese Search report—096106664—TIPO—Jun. 7, 2010.
Translation of Office Action in Japan application 2008-557472 Corresponding to U.S. Appl. No. 11/364,145, citing WO2005057890 and JP2000261539 dated Mar. 8, 2011.

* cited by examiner

*Primary Examiner* — Raymond S Dean
(74) *Attorney, Agent, or Firm* — John L. Ciccozzi; Raphael Freiwirth

(57) ABSTRACT

Systems and methods are provided for setting up a push-to-talk group call in a wireless communications system 100. The call setup information in a call message 400 is established as potential targets 108-114 are identified on a wireless device 106 to reduce call setup time and overall system latency.

25 Claims, 6 Drawing Sheets

SIP INVITE Message

INVITE sip: orig_username@carriername.com SIP /2.0
Via: SIP/2.0/UDP 169.130.12.5
Authorization: PGP version=5.0, signature=...
From: Originator <sip:orig_username@carriername.com>
To: Target <sip:target_usermame@carriername.net
Subject: Hello, Let's talk on a group call.
Contact: <sip: orig_username@O_MS_IP_address
Content-type: application/sdp
Content-Length: ...
Call-ID: 1
User-agent: ms/1.0/1.0
Cseq: 1 INVITE
v=0
o=orig 456789876 2345687654 IN IP4 128.3.4.5
t=0,0
c=IN IP4 O_MS_IP_Address
a=Call_Type: Private_Call
m=audio 5002 RTP/AVP 100
a=rtp_map:100EVRC+

PREPACKAGING CALL MESSAGES FOR EACH TARGET INTERATION IN SETTING UP A PUSH-TO-TALK CALL

BACKGROUND

1. Field of the Invention

The present invention relates to communication in a wireless environment. More particularly, the invention relates to systems and methods for setting up a push-to-talk group call in a wireless communications system.

2. Background

A push-to-talk (PTT) call in a group communications system allows multiple users in different locations to simultaneously communicate. Group communications systems are often used by businesses (e.g., fleets of taxis, buses and trucks, construction crews, etc.) and governmental authorities (e.g., police and law enforcement agencies, fire departments, military users, forest firefighters, etc.). During a push-to-talk call, one user, for example, a taxi cab dispatcher, can simultaneously transmit to the remaining members of the group. The user who initiates the group communication is sometimes called an originator. In some implementations the originator controls which user has the floor to transmit while all other users listen. In other implementations the group communications system is organized in a less centralized manner, so that different members of the group take turns transmitting while all the other members listen. In either case, when the originator begins the process of making a group communication, the call must first be set up within the group communication system to allow all participating users to transmit and receive signals, including control signals for the call.

Push-to-talk group calls between several users are often implemented using Internet Protocol (IP) based schemes. Examples of such IP schemes include the Q-Chat Signaling Protocol (QSP) as the Session Initiation Protocol (SIP). A push-to-talk call between several users tends to take a lot longer to set up than a regular call between two parties. When an originator of a PTT call decides to place a group call, the originator selects a number of target users to participate in the group call and presses the PTT button. The originator must wait until the floor is granted before beginning the group call. In conventional group communication systems there is a considerable delay from the time the originator pushes the PTT button to when the floor is granted to start the PTT group call. This latency period is due to several tasks which must be performed in completing the group call. One of the tasks in setting up a group call involves the collection of the various target users' information, and then packaging a call message in the form of a data packet. What is needed is a group communication system which incurs less latency in setting up a group PTT call.

SUMMARY OF THE INVENTION

Aspects of the invention disclosed herein address the above stated needs by providing methods and systems for setting up a push-to-talk group call in a wireless communications system.

According to various aspects of the invention, apparatus, methods and computer readable media are provided which detect that a PTT call is being set up, and then detect an indication of information for a call parameter of the PTT call. In response to detecting the indication the information (e.g., target information), the information is added to a call message template to begin constructing a call message. Upon detecting a validation of the information or a cancellation of the information, the call message is updated to either add or delete the indication of information. If the wireless device receives an input from the user, for example, depressing the PTT button to begin the group communication, the call message is transmitted from the wireless device to the wireless communication system to begin paging the targets for the group communication.

BRIEF DESCRIPTION OF THE DRAWINGS

The accompanying drawings, which are incorporated in and constitute part of the specification, illustrate various embodiments of the invention, and, together with the general description, serve to explain the principles of the invention.

FIG. 4 depicts an exemplary call message in the form of a SIP INVITE message.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic" or "logic configured to" perform the described action.

Figure 1:
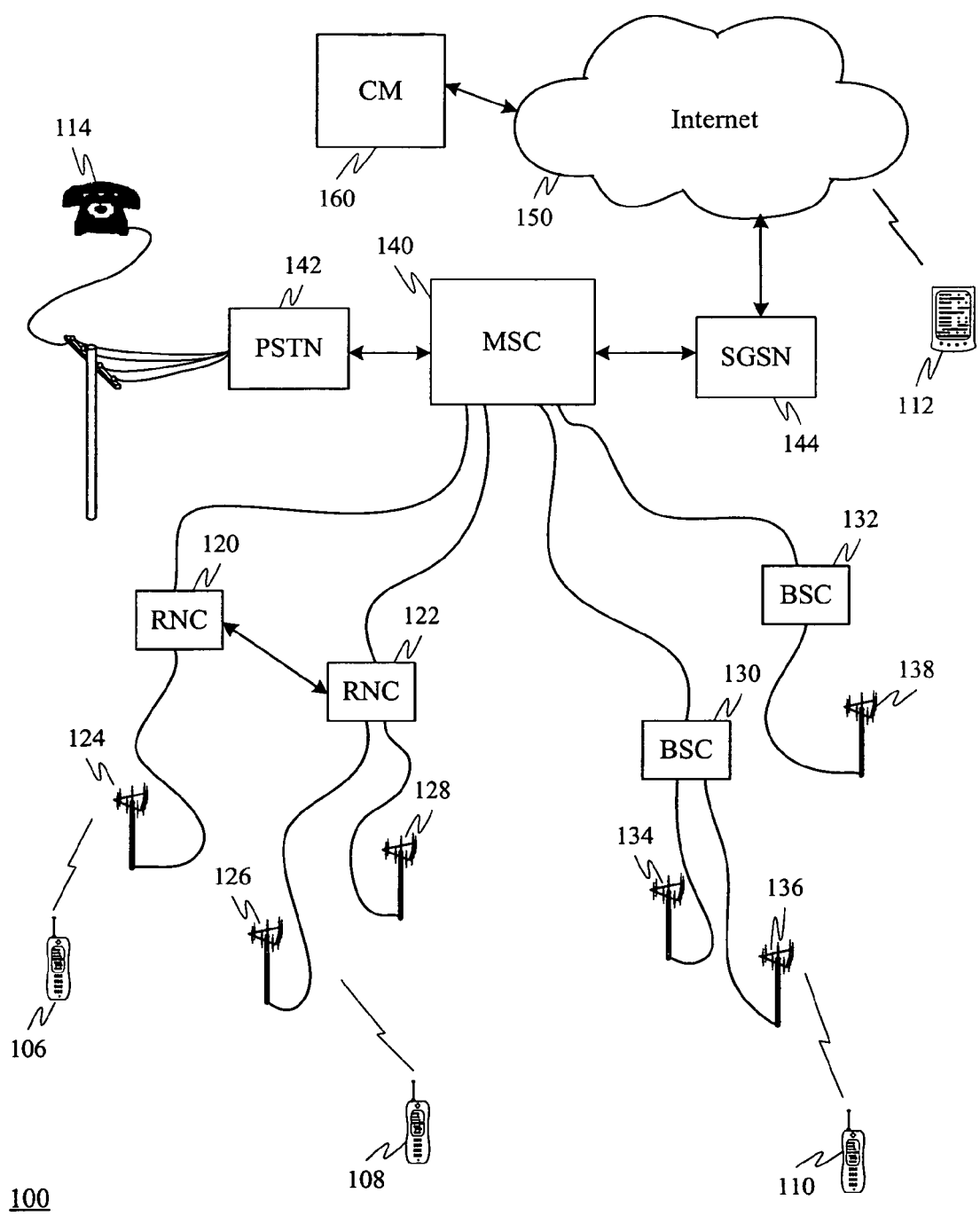
FIG. 1 depicts a communication system in which group communications can take place.

FIG. 1 depicts a wireless communication system 100 which may be used to implement wireless group communications according to various embodiments of the invention. Group communication may also be called push-to-talk communication, dispatch service, net broadcast services (NBS), or point-to-multi-point communication. A group communication (sometimes referred to as a group call) is transmitted from one wireless device to a group of two or more other wireless devices. A "net" is a group of devices authorized and configured to communicate with each other in a group communication system. For example, the wireless devices 106-112 may be members of a net, and as such, would be able to participate in group communications. A net may include two or more wireless devices in some embodiments, three or more wireless devices in other embodiments, or even dozens or hundreds of wireless devices in other embodiments. The wireless devices belonging to a net may be referred to as "members" of the net. Although group communications and nets are discussed in terms of involving wireless devices, a net may also include one or more landline telephones participating in a group communication, such as telephone 114 connected via the public services telephone network (PSTN). The telephone device 114 may be a landline telephone with push-to-talk capability.

A wireless device may belong to more than one net, but generally the device may only be engaged in communications with one net at a particular time. In some embodiments different members of a net may take turns transmitting and receiving group communications. Some embodiments may be implemented such that wireless devices may be able to have monitor-only privileges in a net.

A group communication system may be implemented using an assortment of communication equipment and networks, including First Generation (1G), Second Generation (2G) and Third Generation (3G) equipment. While some legacy 1G network equipment is still in operation, the majority of networks utilize either 2G and/or 3G technology. 1G analog wireless networks were widespread during the early 1990s, but were not readily scalable for the rapid escalation in wireless communications. 2G digital systems provided increased capacity and more services, as compared to 1G networks. Some of the 2G systems currently in operation include Europe's Global System for Mobile Communications (GSM), and the cellular telephone systems of the U.S. based on Interim Standard 136 (IS-136) and Interim Standard 95 (IS-95). Group communications in accordance with the various embodiments may be carried out in appropriately configured 3G, 2G or 1G systems. Quite often communication systems are implemented primarily as 3G systems but also include legacy equipment compatible with 1G or 2G technology. Group communications systems may be implemented as push-to-talk (PTT) wireless systems using half-duplex communication links to each of the wireless devices in the net. Communications among the members of a net may take place within existing communication systems using proven technologies. For example, the exemplary group communication system 100 depicted in FIG. 1 includes 3G equipment (e.g., RNC 120-122 and Node-Bs 124-128) as well as legacy 2G equipment (e.g., BSCs 130-132 and BTS 134-138.

Group communication messages may be transmitted in any of several technologies using Internet Protocol (IP). Such communication technologies may include, for example, CDMA (code division multiple access), TDMA (time division multiple access), FDMA (frequency division multiplexed access), OFDM (Orthogonal Frequency Division Multiplexing), and systems using a hybrid of coding technologies such as GSM, or other like wireless protocols used in communications or data networks. In some embodiments group communications for a net may be transmitted on a single dedicated broadcast channel from one net member to the other members of the net. The dedicated broadcast channel may be implemented at a given frequency range or communication channel. In other embodiments a collection of different frequencies or channels may be allocated to the net by a controller for group communications.

Some systems may use Voice Over Internet Protocol (VoIP) to transmit data encoded with voice information. The communications from a wireless device may be packaged as VoIP frames and transmitted using the net broadcast service (NBS), a VoIP application. The NBS system is described in further detail in U.S. patent application Ser. No. 09/518,985, and U.S. patent application Ser. No. 09/518,776, both filed on Mar. 3, 2000, and each of which are incorporated by reference herein in their respective entireties.

PTT group communications may conform to the 1xEV-DO standard and be configured for half-duplex or full duplex voice communications. The 1xEV-DO standard is a data-optimized variant of the 1xEV-DV standard ("1xEV-DO" stands for 1x Evolution-Data Optimized). Although 1xEV-DO is optimized for data transport, the "data" channel may also be used for voice communication by transmitting packetized voice data. The 1xEV-DO standard—sometimes referred to as IS-856, HRDP (High Rate Packet Data) or CDMA-DO—is compatible with existing CDMA networks such as CDMA2000 systems. This allows 1xEV-DO to be implemented without necessarily requiring entirely new hardware and/or software. Operators may upgrade their systems to offer advanced data services in a cost effective, efficient manner by using 1xEV-DO.

WCDMA is another technology that may be used to implement a group communication system. WCDMA is a 3G technology that uses the CDMA air interface rather than TDMA, thus increasing the data transmission rates of GSM systems. WCDMA is used in the 3G UMTS system (Universal Mobile Telecommunications System) for broadband voice, data and video at rates of up to 2Mbit s/sec. WCDMA, which is specified by the ITU's IMT-2000 3G specification, is also known as the Direct Sequence (DS) mode.

The wireless devices 106-112 depicted in the figure are capable of engaging in group communications, and may be configured in a manner similar to the exemplary wireless device 210 depicted in FIG. 2. The group communication system 100 includes a number of node-Bs 124-128 conforming to 3G, and each being configured to maintain a wireless connection with the wireless devices 106-108 which are sometimes called user equipment (UE) or access terminals (AT). Each node-B, in turn, is connected to one of the radio network controllers, RNC 120-122. In accordance with 3G, the RNC 120 and RNC 122 are interconnected via an Iur interface, thus allowing local communication switching between the RNCs. That is, an RNC-RNC communication link may be established for communications between mobile subscribers registered at node-Bs which have connected RNCs, rather than routing the link through the MSC. For example, a communication from wireless device 106 to wireless device 108 could be routed from RNC-120 to RNC-122 through the Iur interface between the two RNCs.

The exemplary group communication system 100 also includes a number of 2G base transceiver stations (BTS) 134-138, for the purpose of illustration. Each of the BTS 134-138 is connected to one of the base station controllers BSC 130-132. Unlike the 3G RNCs, the 2G BSCs typically do not have the capability for local BSC-BSC communication switching. The BCSs, the RNCs, and other various elements of the system 100 are typically interconnected via a network of landlines which may include fiber optic cable links and portions of the Internet and/or the PSTN. The MSC 140, RNCs 120-122, node-Bs 124-126, BSCs 130-132 and BTSs 134-138 may be connected using such landlines. In some situations RF links or satellite links may be used to interconnect one or more elements of the system 100.

The RNCs 120-122 and the BSCs 130-132 are each connected to a mobile switching center MSC 140. The MSC 140 is connected to the PSTN 142 and to landline PSTN users such as telephone device 114 which may be a landline telephone with push-to-talk capability. The MSC 140 is also connected to the Internet 150 via a Serving GPRS Service Node (SCSN) 144. Some PTT devices 112 may be directly connected to the Internet 150, for example, through a wireless access point or other Internet portal. The wireless devices 106-112 may be implemented as radio handsets or cellular telephones, but may also include many different types of wireless devices such as a wirelessly connected computer, personal digital assistant (PDA), pager, navigation device, music or video content download unit, wireless gaming device, inventory control unit, or other like types of devices communicating wirelessly via the air interface.

The group communication system 100 includes a central database which may be configured as part of communication manager (CM) system 160 to store information associated with the subscriber members of the nets registered with the system, e.g., user identification, current location, and billing information. The CM system 160 may include distributed devices located within various nodes of the system 100 at different locations. The operation of the CM to control and set up group communication is described more fully in U.S. Patent Application No. US2003/0012149 A1, filed on Sep. 12, 2002 and assigned to the present assignee, the disclosure of which is hereby incorporated by reference herein in its entirety.

Figure 2A:
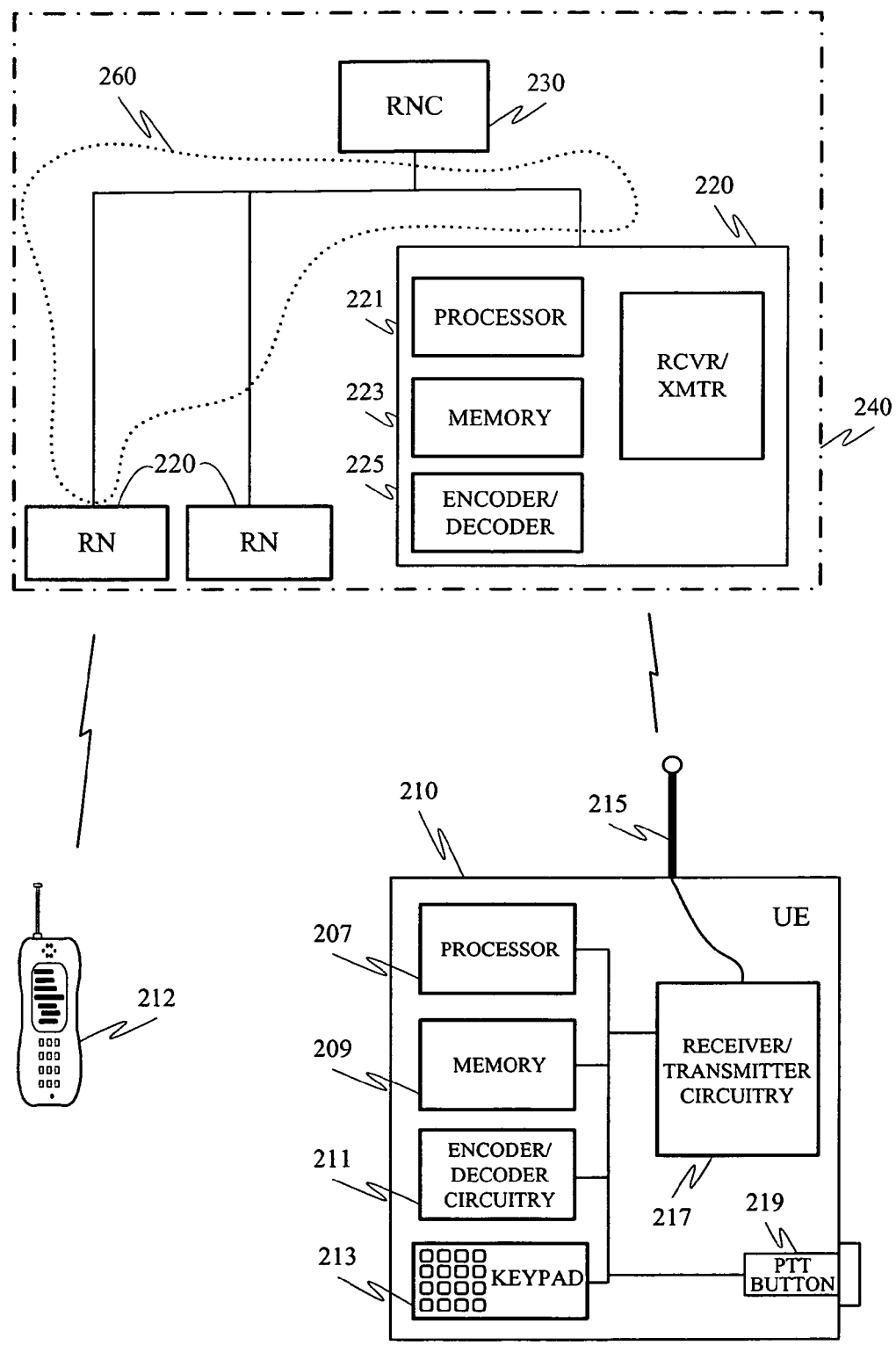
FIGS. 2A and 2B depict a PTT wireless device in accordance with various embodiments of the invention.

FIG. 2A depicts some details of an exemplary PTT access terminal, wireless device 210 and radio access network (RAN) 240. RN 220 includes an encoder/decoder 225 which encodes information to be transmitted and decodes received information in the appropriate coding protocol or scheme. RN 220 includes receiver/transmitter circuitry 227 for wirelessly receiving packets from the wireless device 210, and for transmitting packets to the RNC 230 (which may be transmitted via a landline). RN 220 also includes a processor 221 which contains circuitry or other logic capable of performing or controlling the processes and activities involved in wireless communications, and in particular, the processes and activities set forth herein. For example, the processor 221 may include logic organized to recognize that a user intends to make a PTT group call and begin setting up the call message. RN 220 may include a memory 223 for storing the various protocols, routines, processes or software used in wireless communications. For example, the memory 223 may store one or more transmission, schemes, protocols or strategies for communicating with one or more wireless devices 210, 212. This information may also be stored in a memory of the RNC 230, and communicated to the RN 220 as needed or while performing periodic updates and system maintenance. The RNC 230, RN 220 as well as the BCSs, RNCs, and other various elements of the system are typically interconnected via landlines 260 (e.g., fiber optic cable links, the Internet or the PSTN).

Embodiments of wireless device 210, as shown in FIG. 2A, typically include a processor or other logic 207, memory 209 and encoder/decoder circuitry 211 which perform functions similar to those of the corresponding parts of RN 220. For example, the encoder circuitry 211, or other like circuitry of the wireless device 210, is configured to encode or otherwise encapsulate data into a packet for transmission to RN 220 or other type of base station. The processor 207 of wireless device 210 may be configured in the form of one or more processing circuits executing resident configured logic, a microprocessor, a digital signal processor (DSP), a microcontroller, or a combination of these or other like types of logic hardware, software and/or firmware configured to at least perform the operations described herein. Each wireless device 210 also has a keypad 213, an antenna 215, receiver/transmitter circuitry 217, a PTT button 219, and other controls or electronics known to those of ordinary skill in the art for wirelessly receiving and transmitting information. The term "keypad," as used herein, refers to any alphanumeric keys on the wireless device (e.g., the buttons labeled 0 through 9 for entering telephone numbers), and in some embodiments also includes any buttons, toggles, or other type of switches for receiving manual (or voice entry) inputs from the user. The keypad 213, is configured to receive manually entered data which may be used to set up a call or store information in the memory 209 for future use. Such data may include telephone numbers, PTT addresses, names and addresses or other contact information of people to be called, member lists of various PTT nets, or other such group calling information. The originator's address and target addresses are typically in the form of a Uniform Resource Locators (URL), but may be expressed in terms of a phone number, name, icon, or any other predefined addressing scheme configured for making PTT group communications within the communication system 100. The wireless device 210 generally has installed on it one or more software applications or other logic to control and facilitate wireless PTT group calling. The keypad 213 and display screen are also typically used to interact with the PTT application or other software to specify the preferences and user options for making group calls. The display screen is typically configured to display alphanumeric characters helpful to a user in dialing a telephone number or otherwise setting up a PTT group call. The PTT button 219 is typically used to initiate transmission of the call message, thus starting the process of setting up a PTT group call within a communication network. In some implementations, the user taps the PTT button 219 to put the wireless device in the PTT mode, thus opening the proper application, menus, commands, options or other environment on the wireless device to begin setting up a PTT call.

Latency is a major issue in PTT systems. When an originator of a PTT call decides to call another user, the originator typically selects one or more target addresses to call, presses the PTT button, and then waits until the floor is granted. It may take anywhere from a couple of seconds to ten seconds or more for the group call to be set up. Latency is incurred at many points along the way, one of them being the time it takes the software of the originator's wireless device to collect the targets' information, and package a call message in the form of a data packet. The various embodiments disclosed herein help to reduce this time.

Conventional software for wireless devices typically starts the process at collecting the targets' information and preparing the data packet to send only after the PTT button has been pressed. Embodiments of the invention reduce some of the latency time by providing the software with the target information as the user is scrolling through its address book, or otherwise selecting the target information. Every time a new target is highlighted, the wireless device software can start preparing a call message with the new data, expecting the PTT button to be depressed at any time.

Figure 2B:
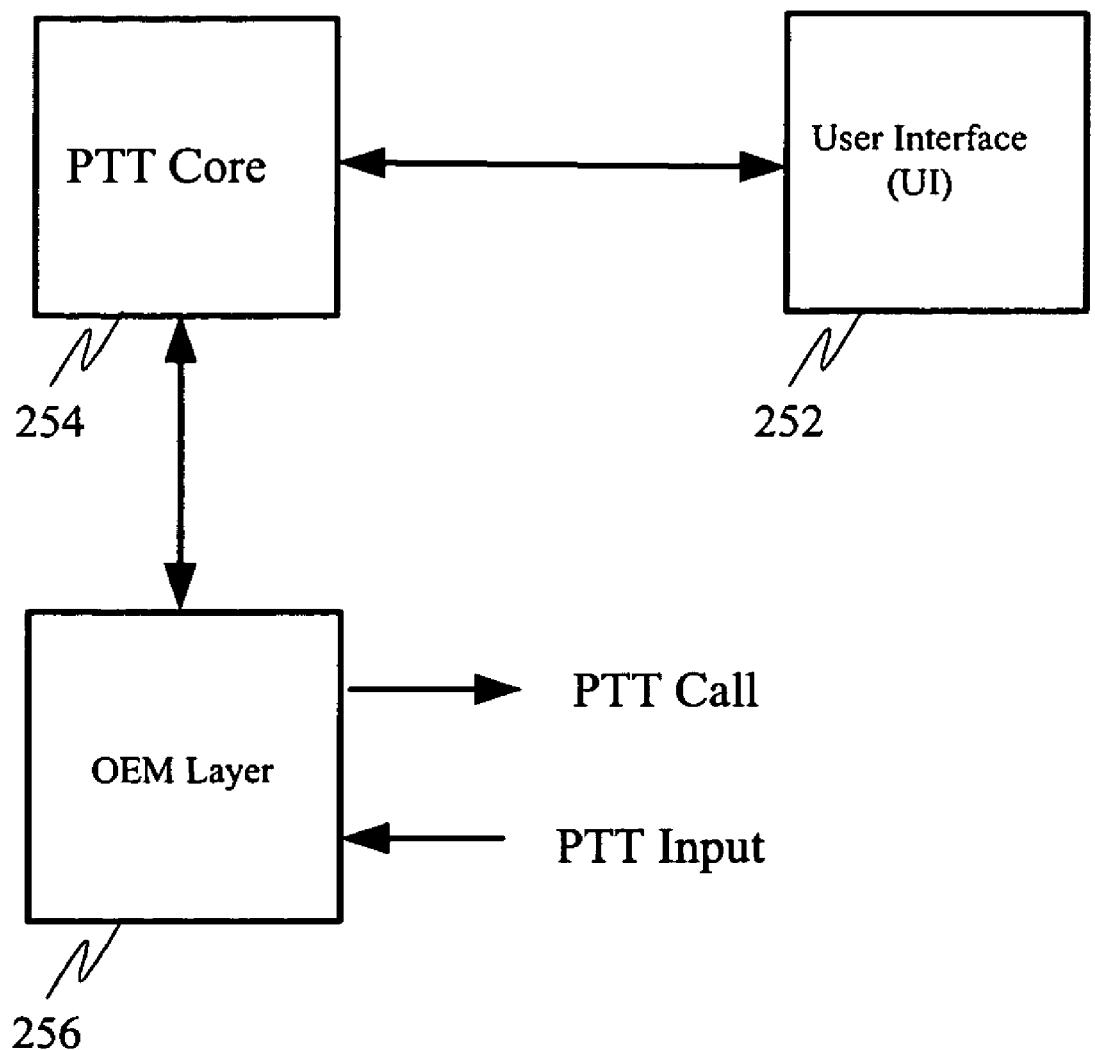

For example, referring to FIG. 2B, as the user iterates through the address book of potential PTT targets, the user interface (UI) 252 or other software can process the new target information, regardless of the user's actual intent to make a PTT call to the particular target being indicated. The software has the target's information on hand and can use it to send it to the PTT Core 254 which can then package it and send it to the OEM layer 256. That is, the UI 252 sends the target address to PTT core 254, and PTT core 254 uses the target address and packages it into a CALL message or INVITE message, for example. If the user does in fact press the PTT button (or otherwise indicate to start the PTT call) while this particular target is selected, target identification and call message packaging have already been performed, and call setup latency will be reduced. However, if the user does not press PTT or passed by the highlighted target address without selecting it, the software can then discard its prepackaged call message with this target's information.

In the illustrated configuration, the UI 252 can identify a potential target (e.g., highlighted name), which can then be used to start to setup a call message by the PTT Core 254 assuming the potential target will actually be used in the PTT call. The pre-packaged message can then be communicated to the OEM layer 256 so that it is resident at the OEM layer 256 and available when a PTT command is received. Those skilled in the art will appreciate that the illustrated embodiment allows for two potential levels of latency reduction. Identifying the potential target and communicating the potential target to the PTT core 254 reduces the time used for the PTT core 254 to query the UI 252 to obtain the target information. Additionally, by pre-packaging the call and sending it to the OEM layer 256, the time used to obtain the call message data from the PTT core 254 is also eliminated. Thus, when the PTT input to initiate a call is received at the OEM layer 256 the call can be processed directly within the OEM layer 256. Accordingly, multiple levels of delay in conventional systems can be avoided by embodiments of the invention.

Those skilled in the art will appreciate that the functional representation of FIG. 2B is merely intended to illustrate aspects of embodiments of the invention. Further, the invention is not limited to this illustrated embodiment. Instead, those skilled in the art will appreciate the embodiments of the invention can reduce the delay due to target acquisition and packaging of the call message regardless of where these functions are implemented. Depending upon the details of a particular implementation, some functions may be implemented in different manners or may be performed by different components. For example, some functions may be performed in the OEM Layer, while in other situations the OEM layer may be bypassed. Typically, the PTT key press is sent from the OEM Layer to the PTT Core. However, when the PTT Core has a CALL Message to send, it may either provide the CALL Message directly to the OEM Layer, or it may send it using another application or application interface. For example, the data packets may be sent via an application interface (e.g., the ISOCKET BREW interface) which can communicate directly with AMSS/DMSS software without involving the OEM Layer specifically.

Figure 3A:
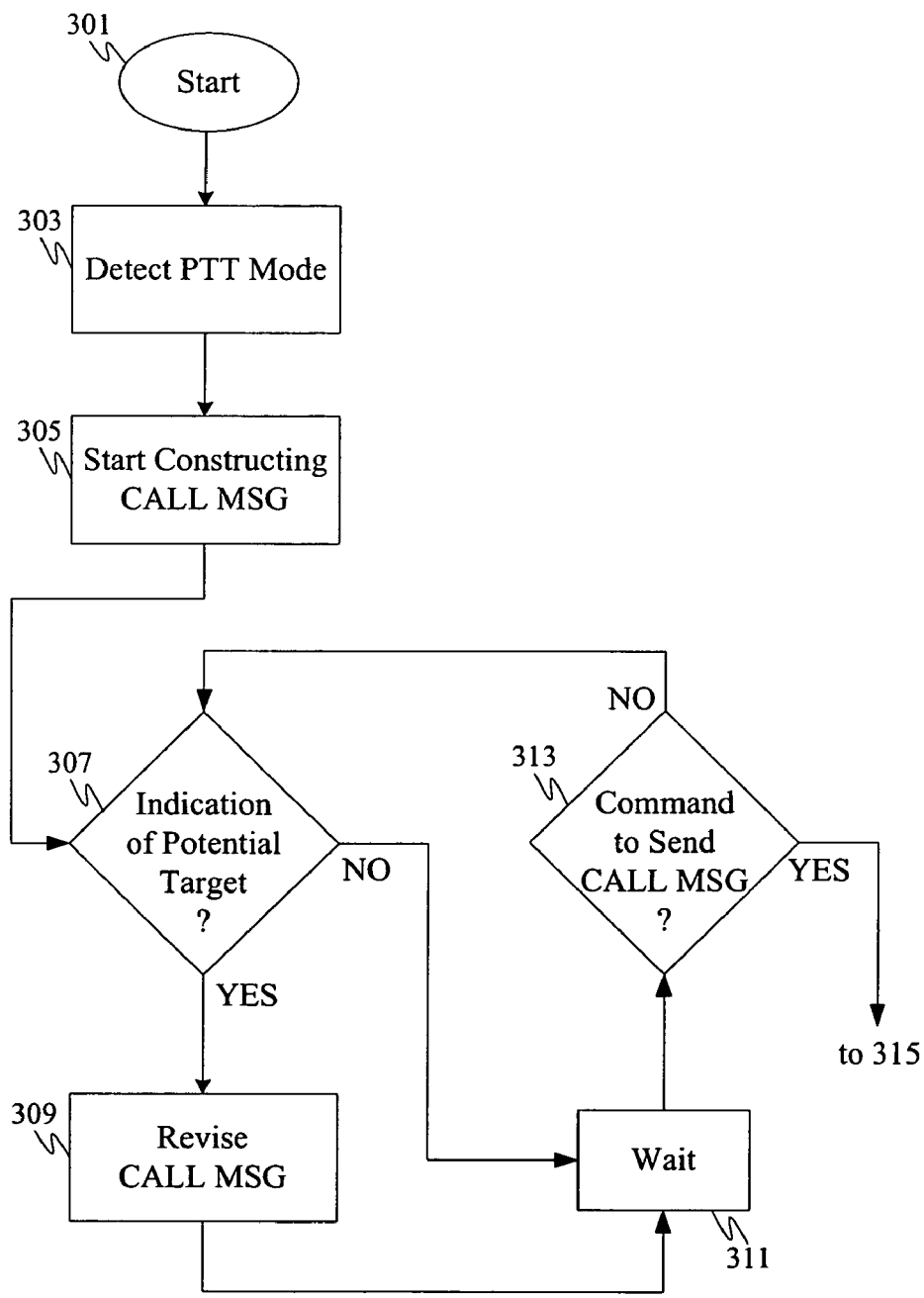
FIGS. 3A and 3B depict a flow diagram of activities in initiating a PTT group call in a wireless communication system, in accordance with various embodiments of the invention.
Figure 3B:
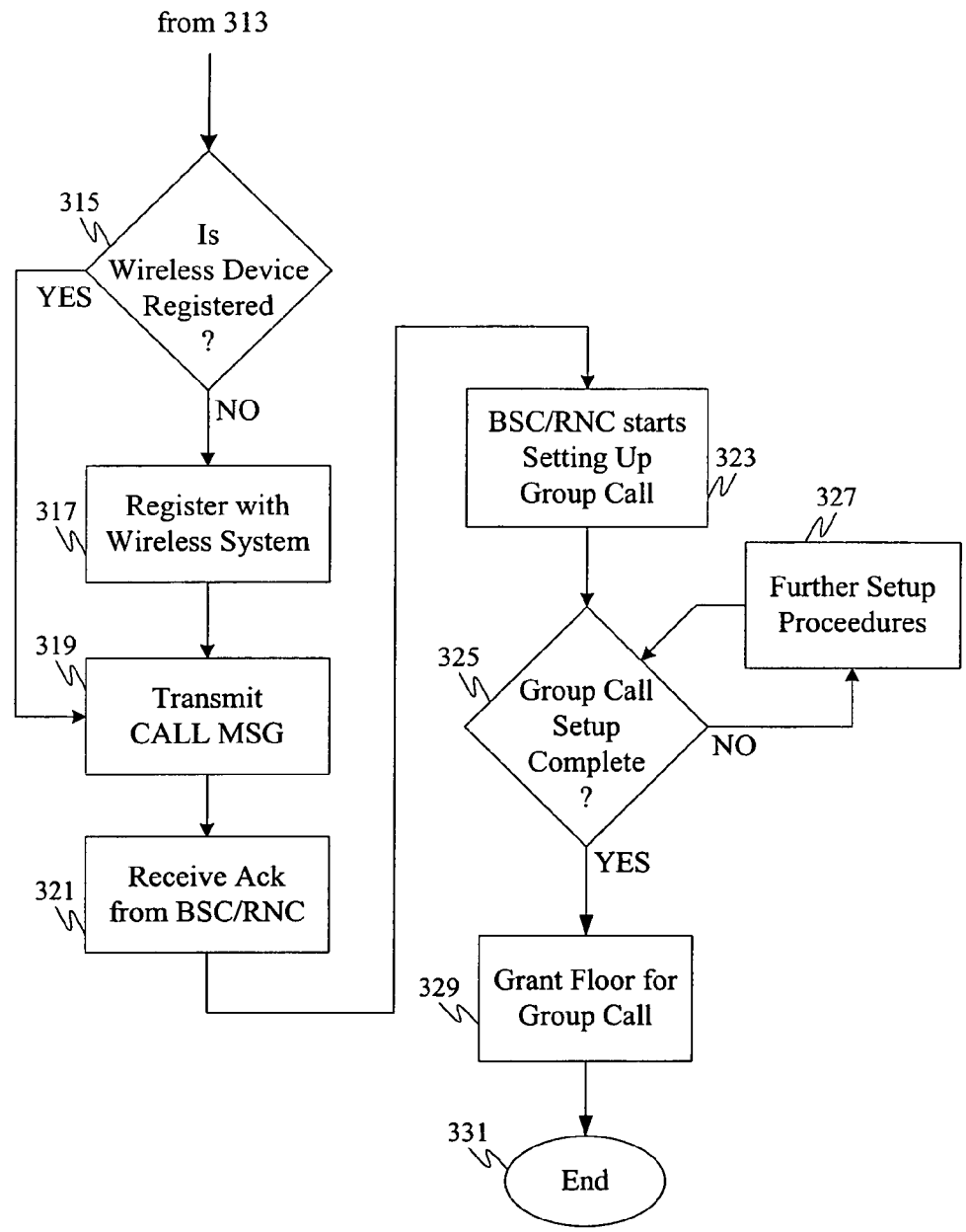

FIGS. 3A and 3B depict a flow diagram of activities in initiating a PTT group call in a wireless communication system. Setting up a PTT group call tends to be more complicated and take longer than setting up a regular point-to-point call between two parties. PTT group calling systems often use Internet Protocol (IP) based schemes to conduct communications, a factor which can cause delays in initially setting up group calls. The Session Initiation Protocol (SIP) is one example of an IP-based protocol which is often used for PTT communications in Group calling systems. SIP may be used to initiate interactive communication sessions such as instant messaging (IM) and computer gaming, and as well as multimedia downloads. SIP is a text-based protocol similar to the HyperText Transfer Protocol (HTTP) and Simple Mail Transfer Protocol (SMTP). One issue with the use of SIP, HTTP and SMTP in a wireless environment is that these IP schemes tend to take up relatively large amounts of bandwidth. Implementing a SIP-based PTT service into a wireless communication system with constrained bandwidth limitations may result in excessive delays in setting up the group communication calls.

Referring to FIG. 3A, the method begins at 301 and proceeds to 303 where the wireless device detects that a PTT call is being set up. This may occur, for example, when a user accesses an address stored on the wireless device, or when the user taps the PTT button 219 to put the wireless device in the PTT mode. In some embodiments, the wireless device may sense a time of day and/or location or other empirical data which indicates the user is likely to place a PTT call. For example, if a construction foreman is in the habit of placing a PTT call to the crew each morning at 7:00 am as he leaves the main office, the wireless device may be configured to sense that a PTT call is being set up if the wireless device is opened (or turned "on") at a time/place which statistically matches the predetermined time/place when other PTT calls were originated. Once the wireless device has determined that the device is in a PTT mode to place a PTT call the method proceeds from 303 to 305. Potential targets can be identified in a variety of manners. For example, the potential target can be identified by a highlighted selection as a user scrolls through an address book of targets. Alternatively, a default target can be identified. Accordingly, the invention is not limited to the examples discussed herein, and any way to place a device into a PTT mode and identify a potential target can be used in embodiments of the invention.

In 305 the wireless device begins constructing a call message. A call message typically contains information such as the address of the originator, the address of the target or targets, the type of encryption and the like. The call message may be a Q-Chat Signaling Protocol (QSP) call message. A SIP INVITE is another example of a call message. FIG. 4 depicts an exemplary call message in the form of a SIP INVITE message. While QSP call messages and SIP INVITEs are two typical examples of call messages, the various embodiments are not limited to these two exemplary types of call messages. In accordance with various embodiments the call message may be in any predefined format or scheme implemented by the communication system in which the wireless device is operating. The call message may be constructed by retrieving a stored template, or other model call message, and populating the fields with known values of data. Initially, some of the fields of the call message may not be known, such as the addresses of all of the targets for the group call. However, as the user continues to interact with the PTT application more fields will become known until the group call has been completely specified and the call message is completed. Once construction of a call message has been started in 305 the method proceeds to 307.

In 307 it is determined whether the wireless device has detected an indication of a potential target address or other PTT group communication parameter. Indications of targets for participants of the PTT group call may come from a number of different activities or sources. For example, when a user accesses an address book stored within the wireless device and highlights a name, this action may be taken as an indication of a target address. In some embodiments, as a user scrolls down a list of potential targets highlighting the various names in the list, it may be interpreted as an indication of a new target address each time a target is highlighted as the user scrolls down the list. If the user selects the highlighted name from the list, the indication of the potential target is validated.

However, if the user simply keeps scrolling down the list past the name without selecting it, then the indication is discarded as a potential target since the name was not selected. In either case, during the time the name from the address list is highlighted it is considered an indication of a potential target until the user either selects the name (validating the indication) or continues scrolling past the name (nullifying the indication). Another example of an indication of a potential target address may occur as a user enters the characters manually, for example, via a keyboard or the keypad 213 shown in FIG. 2A. Each letter/number entered by the user may be treated as more updated information for the potential target address, resulting in the call message being updated to reflect the most recent letter/number entered by the user. Another exemplary indication of a potential target happens when the user accesses a list of targets and checks a box next to the target to be selected. Each time a box is checked, the call message is updated to reflect the new information.

The method constructs a call message based on a mere indication of a potential target, as discussed above. As soon as the indication turns out to be false (the indication is nullified) the call message is revised (e.g., 309) to reflect the updated information. This method may increase the utilization of processing resources in the wireless device because, of the potential targets that are added to the call message, many of them are then discarded because they turn out to be false. However, the increased processor utilization is acceptable in order to improve the performance of the PTT system by saving the time it would take to begin constructing the call message after the PTT button has been pushed. Those skilled in the art will appreciate that latency is a key factor in determining the performance of delay-sensitive applications such as PTT systems. Accordingly, any time savings that reduces the system latency will directly impact the perceived performance of the system.

The process, as discussed above, of constructing a call message based on a mere indication of a potential group call parameter (e.g., an indication of a call target), may be referred to as constructing a hypothesis call message. When the information has been validated or nullified the hypothesis call message may be updated to reflect the more accurate information.

If an indication of a potential target address or other new information for the call message is detected in 307, the method proceeds along the "YES" branch to 309 where the potential target address is added to the call message being constructed. In practice, either the existing call message may be modified to reflect the new information, or else a new call message may be constructed with the new information and the old call message may be discarded (or saved elsewhere for use if it turns out that the new potential target address is not to be a real target). Further, the information detected in 307 may be any type of information used in constructing a call message. For the purposes of illustration and ease of explaining the embodiments, the method has been described in terms of an indication of a potential PTT call target. However, block 307 may entail the detection of any group call parameter or option which may be transmitted in a call message. For example, the user may specify the type of encryption in the call message or may limit one or more of the targets to have listen-only capabilities. Block 307 may involve the detection of any call message parameter used to set up a group communication. Back in 307, if no indication of a potential target address is detected then the call message being constructed is not altered in 311 and the method proceeds from 307 along the "NO" branch to 311.

In 307 any new information which updates the potential targets is taken into account and considered as an indication of potential target information, including potential targets that are abandoned or canceled. For example, a user may be scrolling down a list of potential targets in an address book of the wireless device and a potential target is added to the call message on account of being highlighted. As the user continues scrolling down, highlighting the next name on the list (without selecting the potential target), the previously added potential target is no longer highlighted so it is removed from the call message. Block 307 concerns the detection of new potential targets as well as detecting any updated or more accurate information regarding the potential targets or other aspects of the call message. Also in 307, it is determined whether any indication of a potential target or other call parameter has been validated or nullified. If updated information for the call message is detected in 307 the method proceeds to 309 along the "YES" branch. In 309 the call message is revised (or replaced) to reflect the updated information. Back in 307, if there are no changes to the call message information detected then the method proceeds along the "NO" branch to 311.

In 311 the wireless devices waits for any activity or input which may reflect new information. The activities or inputs include, for example, the user scrolling down to another entry in the list of PTT targets, the selection of a name from the list, a keypad entry on the wireless device, the PIT button being pushed, or other like activities, instructions or inputs. If any input is received, or after a predetermined amount of time has passed, the method proceeds from 311 to 307. The amount of time that the process waits in 311 may not be very long. For example, the method may wait in 311 only as long as it takes to scroll through a name on an address list of potential targets, or even as little as a millisecond or less. In some embodiments, the "wait" block 311 may be eliminated, in which case the method proceeds directly from either 307 or 309 to 313.

Referring to block 313, if no command or other input is received to initiate the group call the method proceeds along the "NO" branch back to 307. As mentioned above, once the user has selected all the target addresses desired for the group call, the user typically depresses the PTT button on the wireless device to initiate the group call set up. In some implementations which do not use a dedicated PTT button, this may be done by activating a predefined control such as a menu item or by toggling the "SEND" button while the wireless device is in the PTT mode. If, in 313, a command or other input is received to initiate the group call the method proceeds along the "YES" branch to 315 of FIG. 3B.

Referring to FIG. 3B, in 315 it is determined whether the wireless device is registered in the wireless communication system. If the wireless device is not registered in the system, the method proceeds from 315 along the "NO" branch to 317 where the wireless device and system communicate back and forth to register the wireless device and allocate a traffic channel to the wireless device. Once the wireless device is registered with the system the method proceeds to 319. In some embodiments the call message may be sent while the wireless is being registered, before the registration process has been completed. That is, the call message may be sent as part of, or in conjunction with, the messages sent between the wireless device and the communication system during the registration process. In other embodiments the process of registering the wireless device (if it is not already registered) may be started as soon as it is determined that the wireless device is in the PTT mode, e.g., back in block 303. Returning to 315, if it is determined that the wireless device is already registered, the method proceeds from 315 along the "YES" path to 319.

In 319 the wireless handset transmits the call message to via the wireless communication system to pass on the parameters for setting up the PTT group call. The method proceeds to 321 where the wireless device receives an acknowledgement back from the communication system indicating that the call message has been received and the process of setting up the group call is in motion. Depending upon the specifics of the implementation, the acknowledgement may either be received back from an RNC or BSC of the system (e.g., RNC 120 or BSC 130 of FIG. 1) or may be received back from the Node-B or base station (e.g., Node-B 124 or base station 134), or other point of contact between the wireless device and the wireless communication system. The method proceeds from 321 to 323 where the call message is forwarded from the BSC or RNC to begin setting up the group call. Upon determining that the call message is for setting up a PTT group communication, the BSC/RNC typically passes the call message on to a Communication Manager within the wireless system 100 (e.g., the CM 160) to control the process of setting up the group call. The CM 160 pages the various the targets specified in the call message. One exemplary process of setting up the group communication is described more fully in U.S. Patent Application No. US2003/0012149 A1, filed on Sep. 12, 2002 and assigned to the present assignee, the disclosure of which is hereby incorporated by reference herein in its entirety. The method proceeds from 323 to 325 where it is determined whether the group call setup is complete.

In 325 it is determined whether the group call setup is complete. Starting from the time the user presses the PTT button to send the call message it may take from less than one second to as much as several seconds or more until the various pages have been sent and responses have been received back to complete the group call setup. If the group call has not yet been set up the method proceeds to 327 via the "NO" branch and back around to 325 for further setup procedures until the group call has been properly setup. Once it has been determined in 325 that the setup of the group call has been completed the method proceeds from 325 to 329 via the "YES" branch. In 329 the floor is granted for the group call allowing one of the members of the net to begin speaking. Typically, the floor is initially granted to the originator in block 329. Once the floor is granted in 329 the method proceeds to 331 and ends.

The figures are provided to explain and enable the invention and to illustrate the principles of the invention. Some of the activities for practicing the invention shown in the method block diagrams of the figures may be performed in an order other than that shown in the figures, or described in a manner other than the exemplary descriptions provided herein. For example, the act of detecting whether the PTT button has been depressed to send the call message in block 313 may be continuously performed in the background at all times in conjunction with all other steps, rather than being performed after 311 and before 307/315 as shown in FIG. 3A. Also, in some implementations block 311, which specifies to wait for the next activity or input which may reflect new information may be omitted from the diagram. Further, many elements of the various embodiments may be known by terms other than those used herein to describe the various embodiments. For example, the term "wireless device" used herein could be replaced, in some instances, with the term "user" in describing some of the embodiments, (e.g., the phrase "the wireless device is granted permission to talk" may, in some instances, be interpreted to mean the same as "the user is granted permission to talk").

Those of ordinary skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Those of ordinary skill in the art will also appreciate that the various controlling logic, illustrative methodology blocks, modules, circuits, and algorithm routines described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Practitioners of ordinary skill in the art will know to implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, computer or state machine. A processor may also be implemented as a combination of computing devices, e.g., a combination of a DSP and a microprocessor, a plurality of microprocessors, one or more microprocessors in conjunction with a DSP core, or any other such configuration.

The activities of methods, routines or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor in such a manner that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the illustrated and discussed embodiments will be readily apparent to those of ordinary skill in the art, and the principles defined herein may be applied to other embodiments without departing from the spirit or scope of the invention. Thus, the present invention is not intended to be limited to the embodiments shown herein but is to be accorded the widest scope consistent with the principles and novel features disclosed herein. For instance, group communications, and in particular, PTT, are generally thought of as voice communications. However, either voice or data, or both, may be transmitted as group communications.

In describing various embodiments of the invention, specific terminology has been used for the purpose of illustration and the sake of clarity. For example, the term "net" has been used to denote a group of communication device users authorized to communicate with each other. However, the invention is not intended to be limited to the specific terminology so selected. It is intended that each specific term includes equivalents known to those of skill in the art as well as all technical equivalents which operate in a similar manner to accomplish a similar purpose. Hence, the description is not intended to limit the invention. The invention is intended to be protected broadly within the scope of the appended claims.

What is claimed is:

1. A method for setting up a push-to-talk (PTT) group communication at a wireless device, the method comprising:
   detecting an indication of information related to a potential selection of a PTT call parameter for the group communication;
   adding the information to a call message in response to the detecting of the indication before an instruction to transmit the call message is received from a user of the wireless device, wherein the call message is configured to request set-up of a call between the wireless device and at least one call target;
   receiving, after the information has been added to the call message, a validation of the information; and
   transmitting the call message.

2. The method of claim 1, further comprising:
   receiving an instruction to transmit the call message after the information has been added to the call message.

3. The method of claim 2, wherein the instruction to transmit the call message is indicated by detecting that a PTT button on the wireless device has been depressed.

4. The method of claim 1, wherein the information is a target address.

5. The method of claim 4;
   wherein the validation of the information is indicated by detecting an input to select the target address for the group communication.

6. The method of claim 5, wherein the indication is a first indication and the target address is a first target address, the method further comprising:
   detecting a second indication of a second target address for the group communication;
   adding the second target address to the call message in response to the detecting of the indication; and
   removing the second target address from the call message in response to receiving an indication of cancellation of the information.

7. The method of claim 6, wherein the cancellation is indicated by detecting that another target address has been highlighted without selecting the second target address.

8. The method of claim 1, wherein the call message is at least one of a Session Initiation Protocol (SIP) INVITE message or a Q-Chat Signaling Protocol (QSP) call message.

9. The method of claim 1, wherein the PTT group communication is a half-duplex communication.

10. The method of claim 1, wherein detecting the indication of the information comprises:
    detecting a selection of a target address from an address book stored in the wireless device.

11. The method of claim 10, wherein the selection of a target address is indicated by highlighting the selection on a display of the wireless device.

12. A software program product comprising a computer readable medium for storing the software program in the wireless device, the software program including program code for setting up a push-to-talk (PTT) group communication, wherein the software program upon being executed causes the wireless device to:
    detect an indication of information related to a potential selection of a PTT call parameter for the group communication;
    add the information to a call message in response to the detection of the indication before an instruction to transmit the call message is received from a user of the wireless device, wherein the call message is configured to request set-up of a call between the wireless device and at least one call target; and
    receive, after the information has been added to the call message, a validation of the information.

13. The software program product of claim 12, further causing the wireless device to:
    receive an instruction to transmit the call message after the information has been added to the call message; and
    transmit the call message.

14. The software program product of claim 13, wherein the instruction to transmit the call message is indicated by detecting that a PTT button on a wireless device has been depressed.

15. The software program product of claim 12, wherein the information is a target address.

16. The software program product of claim 15;
    wherein the validation of the information is indicated by detecting an input to select the target address for the group communication.

17. The software program product of claim 16, wherein the indication is a first indication and the target address is a first target address, the software program product further causing the wireless device to:
    detect a second indication of a second target address for the group communication;
    add the second target address to the call message in response to the detecting of the indication; and
    remove the second target address from the call message in response to receiving an indication of cancellation of the information.

18. The software program product of claim 17, wherein the cancellation is indicated by detecting that another target address has been highlighted without selecting the second target address.

19. A wireless device for setting up a push-to-talk (PTT) group communication, the wireless device comprising:
    means for detecting an indication of information related to a potential selection of a PTT call parameter for the group communication;
    means for adding the information to a call message in response to the detecting of the indication before an instruction to transmit the call message is received from a user of the wireless device, wherein the call message is configured to request set-up of a call between the wireless device and at least one call target; and
    means for receiving, after the information has been added to the call message, a validation of the information.

20. A wireless device configured to conduct a push-to-talk (PTT) group communication, the wireless device comprising:
    memory configured to store a template for use in constructing a call message;
    means for detecting an indication of information related to a potential selection of a PTT call parameter for the group communication and adding the information to a call message in response to the detecting of the indication before an instruction to transmit the call message is received from a user of the wireless device, wherein the call message is configured to request set-up of a call between the wireless device and at least one call target; and a keyboard configured to receive, after the information has been added to the call message, a validation of the information.

21. The wireless device of claim 20, further comprising:
a display screen configured to display alphanumeric characters.

22. The wireless device of claim 20, further comprising:
a PTT button configured to receive an input to transmit the call message after the information has been added to the call message.

23. The wireless device of claim 22, further comprising:
transmitter circuitry configured to transmit the call message in response to the input to the PTT button.

24. The wireless device of claim 20, wherein the call message is at least one of a Session Initiation Protocol (SIP) INVITE message or a Q-Chat Signaling Protocol (QSP) call message.

25. The method of claim 1,
wherein the detecting, adding and receiving steps are performed at a wireless device, and
wherein the validation of the information corresponds to detecting that the potential selection of the PTT call parameter has actually been selected by a user of the wireless device.

* * * * *

UNITED STATES PATENT AND TRADEMARK OFFICE
CERTIFICATE OF CORRECTION

| | | |
|---|---|---|
| PATENT NO. | : 7,991,416 B2 | Page 1 of 1 |
| APPLICATION NO. | : 11/364145 | |
| DATED | : August 2, 2011 | |
| INVENTOR(S) | : Lindner | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1253 days.

Signed and Sealed this
Twentieth Day of December, 2011

David J. Kappos
*Director of the United States Patent and Trademark Office*